United States Patent
Garay et al.

(10) Patent No.: US 7,366,911 B2
(45) Date of Patent: Apr. 29, 2008

(54) METHODS AND APPARATUS FOR COMPUTATIONALLY-EFFICIENT GENERATION OF SECURE DIGITAL SIGNATURES

(75) Inventors: Juan A. Garay, West New York, NJ (US); Bjorn Markus Jakobsson, Hoboken, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1297 days.

(21) Appl. No.: 10/014,763

(22) Filed: Dec. 11, 2001

(65) Prior Publication Data

US 2003/0110383 A1  Jun. 12, 2003

(51) Int. Cl.
*H04L 9/00* (2006.01)

(52) U.S. Cl. .................... 713/180; 380/30; 380/285
(58) Field of Classification Search ............ 713/180, 713/176, 168; 380/30
See application file for complete search history.

(56) References Cited

U.S. PATENT DOCUMENTS

| | | | | |
|---|---|---|---|---|
| 5,016,274 A | * | 5/1991 | Micali et al. ............... 705/66 |
| 5,680,455 A | * | 10/1997 | Linsker et al. ............ 380/246 |
| 5,757,914 A | * | 5/1998 | McManis ................... 713/187 |
| 6,298,153 B1 | * | 10/2001 | Oishi ......................... 382/186 |
| 6,453,296 B1 | * | 9/2002 | Iwamura ....................... 705/1 |
| 6,711,400 B1 | * | 3/2004 | Aura ............................ 455/411 |
| 2002/0095581 A1 | * | 7/2002 | Imai et al. ................... 713/180 |

\* cited by examiner

*Primary Examiner*—Gilberto Barrón, Jr.
*Assistant Examiner*—Samson Lemma

(57) ABSTRACT

Methods and apparatus are disclosed for generation of secure and efficient digital signatures in an information processing system. The system includes one or more user devices, a signing aid or other intermediary device, and a verifier. A given user device has associated therewith key pairs (s, p) and (s', p') corresponding to respective first and second digital signature protocols. As part of a setup process, an agreement relating to the public keys p and p' is signed by both the user device and the intermediary device, and the resulting twice-signed agreement is stored by both the user device and the intermediary device. A first digital signature s1 is then generated on a message m or a hash h(m) thereof in the user device using the secret key s' and is sent to the verifier. The verifier in turn sends s1 to the intermediary, and the intermediary checks that s1 is a valid digital signature for the user device. If s1 is valid, the intermediary device generates a second digital signature s2 on m or h(m) using the secret key s, and s2 is returned to the verifier as a signature generated by the user device. The intermediary may be configured to wait a predetermined delay period between checking that s1 is a valid signature and generating s2, such that a user may contact the intermediary device and upon providing an access code thereto direct the intermediary device not to generate s2.

6 Claims, 3 Drawing Sheets

METHODS AND APPARATUS FOR COMPUTATIONALLY-EFFICIENT GENERATION OF SECURE DIGITAL SIGNATURES

FIELD OF THE INVENTION

The invention relates generally to cryptographic techniques which may be implemented in computer networks, wireless networks, communication devices or other types of information processing systems and devices, and more particularly to techniques for generating secure digital signatures in a computationally-efficient and theft-resistant manner within such systems and devices.

BACKGROUND OF THE INVENTION

Portable communication devices such as mobile telephones, personal digital assistants (PDAs) and "wearable" computers generally have limited computational resources in terms of one or more factors such as memory, processing power, communication bandwidth and network connection time. Such devices are therefore referred to herein as "lightweight" devices. Although lightweight devices are increasingly being used for sending and retrieving information over the Internet, their limited resources can become problematic for certain applications, such as electronic commerce, that require the use of digital signatures. More specifically, the computational requirements associated with many well-known digital signature protocols can prevent effective implementation of such protocols in lightweight devices. By way of example, it can take about thirty seconds to perform one simple modular exponentiation on a processor of the type that is common in mobile telephones and PDAs. Increasing the processor speed will cause a faster battery drain or require bulkier batteries, neither of which is desirable.

While there are conventional signature protocols, such as Merkle and Lamport signatures, that are well suited for lightweight device applications, these signatures are generally incompatible with existing and proposed public-key infrastructures (PKIs).

There are also a number of substantial security risks associated with the generation of digital signatures on lightweight devices using conventional techniques. One such risk arises from theft of the device itself. In such a situation, the thief may be able to produce signatures in the name of the victim of the theft.

Another problem is the potential for "bait-and-switch" attacks that may be implemented by viruses or other mechanisms. For example, a virus could be configured to prompt a user of a lightweight device to sign an innocuous message presented on a display of the device, and after the user agrees to sign, to replace that message with a different message on which the signature is generated. Once this signature has been generated, the user has in principle agreed to any corresponding contract terms, whatever they may be.

Another related attack is one in which a virus is configured to bypass a stage at which user consent is requested, so as to cause a digital signature to be generated on a message without user consent.

It is also possible that a secret key of the user may be compromised by a virus or other mechanism, such that an attacker is thereby permitted to generate signatures on arbitrary messages produced by the user.

These security risks create a danger that users may be held to have entered contracts that they never intended to enter.

On the other hand, there is also a significant danger for digital signature recipients that a purported signer can later argue that he or she did not generate the signature. This latter situation is referred to as signature repudiation. As a result of these and other problems, utilization of digital signatures in electronic commerce and other important applications may be unduly limited.

Although it is known in the art to revoke public keys in order to combat one or more of the above-identified problems, there are generally no effective techniques available that allow for revocation of particular digital signatures. A revoked public key means that any signatures known to have been generated using the corresponding secret key after the revocation are considered invalid, while signatures known to have been generated before the revocation are considered valid.

However, a problem arises with those signatures that are claimed to have been generated before revocation, but which in actuality are not. Existing public key revocation techniques are inadequate in these and other respects.

A need therefore exists in the art for improved techniques for generating digital signatures, so as to overcome the security risks and signature repudiation problem identified above, while also being computationally efficient so as to permit implementation in mobile telephones, PDAs, wearable computers and other lightweight devices.

SUMMARY OF THE INVENTION

The invention provides methods and apparatus for generation of secure digital signatures in an information processing system. The system includes one or more user devices, a signing aid or other intermediary device, and a verifier.

In accordance with a first aspect of the invention, a given user device has associated therewith key pairs (s', p') and (s, p) corresponding to respective first and second digital signature protocols. The first digital signature protocol is preferably suitable for "fast" signature generation and has a computational efficiency compatible with the resources of a lightweight user device. The second digital signature protocol may be an arbitrary protocol, and may have a computational efficiency substantially lower than that of the first digital signature protocol. As part of a setup process, an agreement relating to the public keys p and p' is signed by both the user device and the intermediary device, and the resulting twice-signed agreement is stored by both the user device and the intermediary device. A first digital signature s1 is generated on a message m or a hash h(m) thereof in the user device using the secret key s' and is sent to the verifier. The verifier in turn sends s1 to the intermediary, and the intermediary checks that s1 is a valid digital signature for the user device. If s1 is valid, the intermediary device generates a second digital signature s2 on m or h(m) using the secret key s, and s2 is then returned to the verifier as a signature generated by the user device.

In accordance with another aspect of the invention, the intermediary may be configured to wait a predetermined delay period between checking that s1 is a valid signature and generating s2 which is returned to the verifier. This allows a user associated with the user device to contact the intermediary device and upon providing an access code thereto direct the intermediary device not to generate s2.

Advantageously, the invention allows secure digital signatures to be generated in an efficient manner on a lightweight device such as a mobile telephone, personal digital assistant (PDA) or wearable computer, while also avoiding the above-noted signature repudiation problem.

DETAILED DESCRIPTION OF THE INVENTION

The present invention will be illustrated below in conjunction with an exemplary information processing system in which the techniques of the invention are implemented in a network-based application using a lightweight device such as, e.g., a mobile telephone, personal digital assistant (PDA) or wearable computer. The lightweight device in this example system is configured to communicate with one or more servers or other information processing entities over a communication network such as a cellular network or the Internet. It should be understood, however, that the invention is more generally applicable to any type of electronic processing system or device application in which it is desirable to provide secure signature generation in a computationally-efficient manner.

Figure 1:
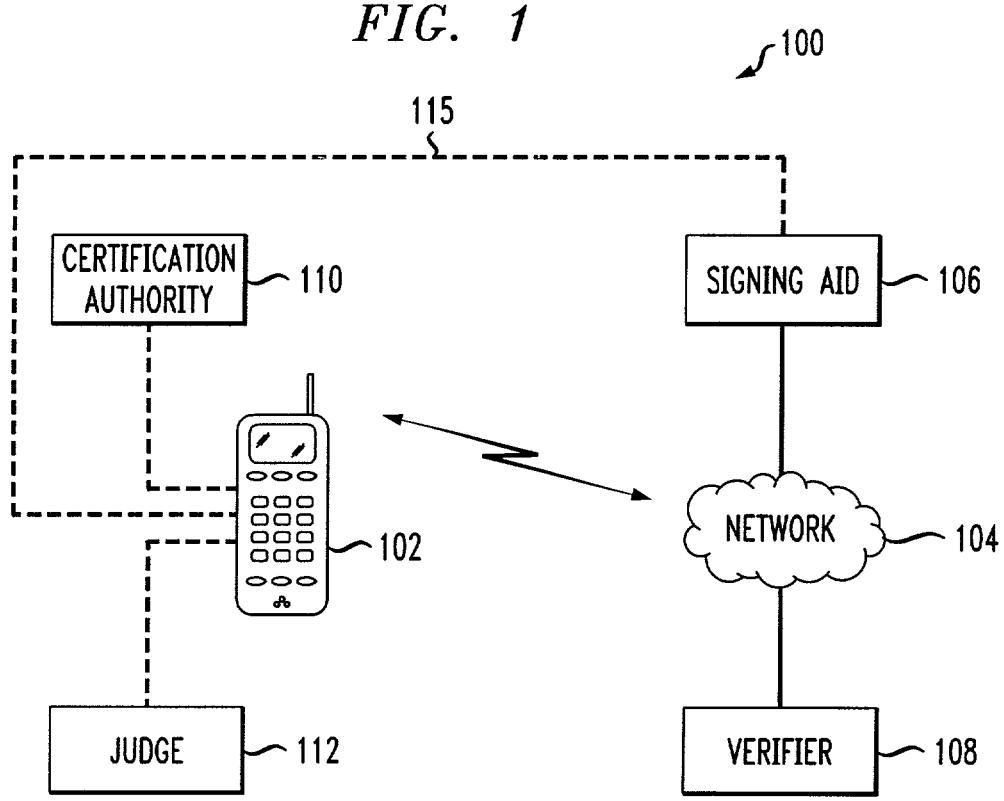
FIG. 1 shows a block diagram of an example information processing system configured to provide secure signature generation in accordance with an illustrative embodiment of the invention.

FIG. 1 shows an exemplary processing system 100 in which a secure signature generation process is implemented in accordance with an illustrative embodiment of the invention. The system 100 includes a user device 102 which communicates over a network 104 with a signing aid 106 and a verifier 108. The signing aid 106 and verifier 108 may each be implemented as a computer, a server, a set of servers, or another suitable arrangement of one or more processor-based devices or other processing elements. The user device 102 is also configured to communicate with a certification authority 110 and a judge 112 as indicated. A secure private channel 115 is preferably available between the user device 102 and the signing aid 106. Such a channel may alternatively be provided through the network 104.

Although illustrated as discrete elements in the system 100, the user device 102, signing aid 106, verifier 108, certification authority 110 and judge 112 may each be implemented in a distributed manner, e.g., as a combination of multiple interconnected devices. Moreover, one or both of the certification authority 110 and judge 112 may also be configured for communication with other system elements over the network 104.

The term "user" herein is intended to be construed generally so as to include a user device or an actual user of that device. Operations herein that are indicated as being performed by a user therefore may be performed by a user device or by an associated user or a combination of both.

In operation, user device 102 interacts with signing aid 106 and verifier 108 to digitally sign a message in a secure and efficient manner such that the resulting message can be verified by the verifier 108. The operation of these elements with regard to signature generation will be described in greater detail below in conjunction with the flow diagrams of FIGS. 3 and 4.

Although illustrated in this embodiment as a mobile telephone or PDA, the user device 102 may alternatively be implemented as a desktop or portable personal computer, a wearable computer, a television set-top box or any other type of device capable of transmitting or receiving information over network 104. In addition, there may be multiple such devices associated with a given user. For example, a given user may have a mobile telephone as well as a desktop or portable computer, and may utilize both devices for signature generation.

The network 104 may be implemented as a wireless network, a global data communications network such as the Internet, a private "intranet" network, an "ad-hoc" network or any other suitable data communication medium, as well as portions or combinations of such networks or other communication media.

It should be understood that although a particular arrangement of user device 102, signing aid 106, verifier 108 and other elements are shown in the FIG. 1 embodiment, the invention is more generally applicable to any number, type and arrangement of such elements.

Figure 2:
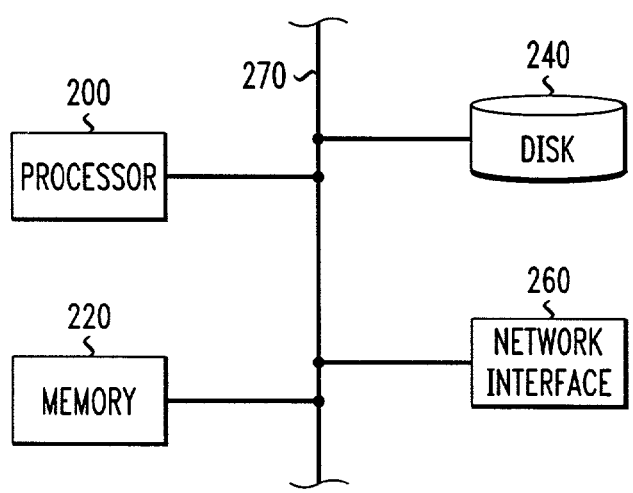
FIG. 2 is a block diagram of one possible implementation of a given one of the processing elements of the system of FIG. 1.

FIG. 2 shows one possible implementation of a given one of the information processing elements of system 100. The implementation in FIG. 2 may thus represent at least a portion of one or more of the user device 102, the signing aid 106 or the verifier 108. This implementation includes a processor 200, an electronic memory 220, a disk-based memory 240, and a network interface 260, all of which communicate over a bus 270. The processor 200 may represent a microprocessor, a central processing unit, a digital signal processor, an application-specific integrated circuit (ASIC), or other suitable processing circuitry.

It should be emphasized that the implementation shown in FIG. 2 is simplified for clarity of illustration, and may include additional elements not shown in the figure. In addition, other arrangements of processing elements may be used to implement one or more of the elements of the system 100. Furthermore, one or both of the certification authority 110 and the judge 112 may be implemented in a manner similar to that shown in FIG. 2.

The elements 102, 106, 108 and 112 of system 100 execute software programs in accordance with the invention in order to provide secure signature generation in a manner to be described in detail below. The invention may be embodied in whole or in part in one or more software programs stored in one or more of the element memories, or in one or more programs stored on other machine-readable media associated with one or more of the elements of the system 100.

The present invention in accordance with one aspect thereof allows the user device 102 and the signing aid 106 to collaborate in the generation of digital signatures of arbitrary type, as will be explained in conjunction with FIGS. 3 and 4. Another aspect of the invention relates to providing improved revocation of digital signatures in case of theft, viral attacks or other problems.

The signing aid 106 in the illustrative embodiment of FIG. 1 is configured as a third party operative to transform "cheap" signatures, i.e., signatures that can be generated in a computationally-efficient manner on a lightweight device such as user device 102, into arbitrary types of signatures that may have more desirable properties than the cheap signatures. The signing aid 106 need not be a trusted party, due to the provision of conflict resolution mechanisms to be described in greater detail below.

Figure 3:
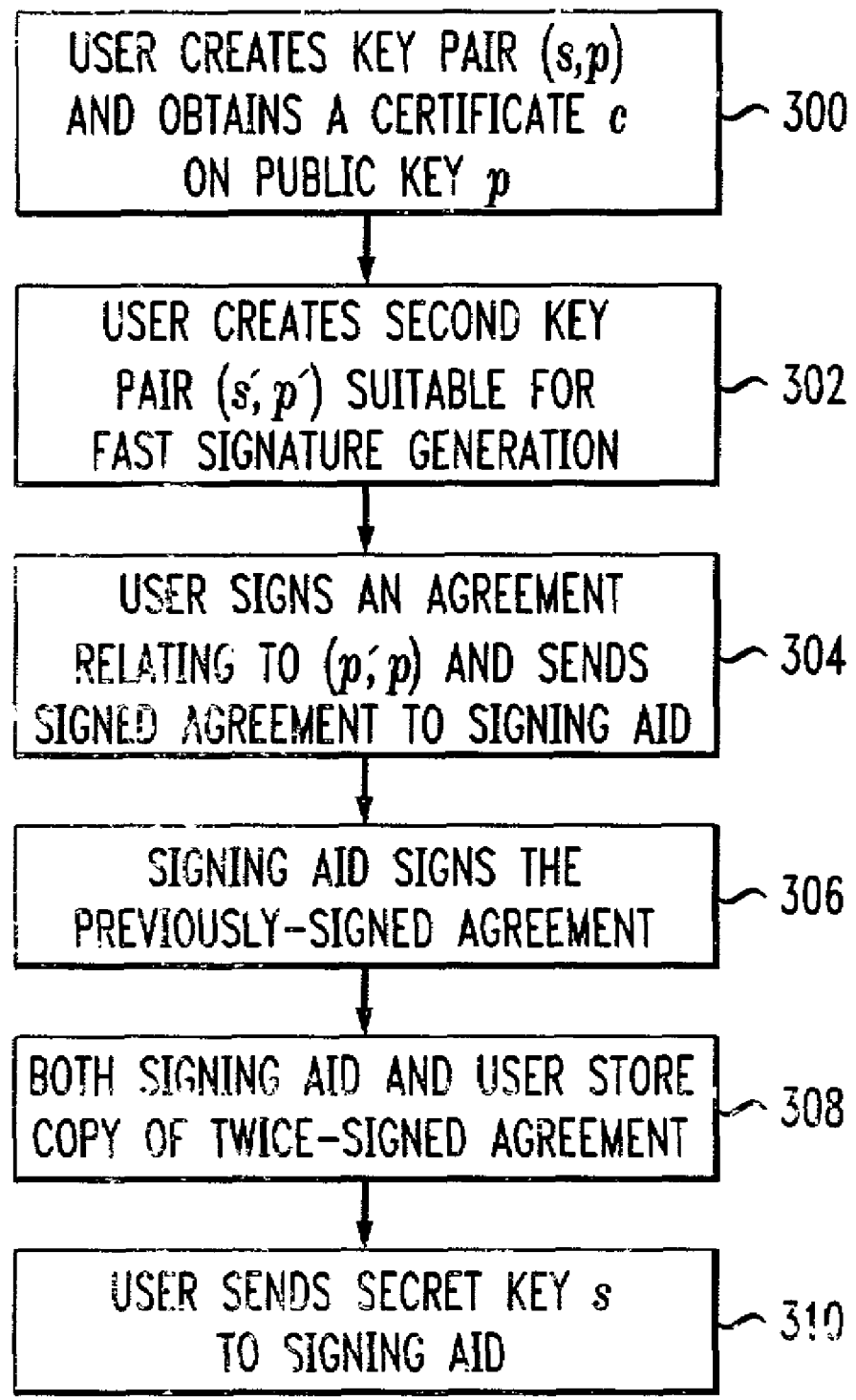
FIGS. 3 and 4 are flow diagrams illustrating respective signature setup and signature generation processes in accordance with the invention.

FIG. 3 shows an illustrative setup process that is performed by the user device 102 in conjunction with the signing aid 106 prior to signature generation. This process is preferably performed over the secure private channel 115, as will be appreciated by those skilled in the art.

In step 300 of the FIG. 3 process, a user creates a key pair (s, p) using well-known conventional public key cryptography techniques, where s denotes a secret key of the user and p denotes a public key of the user. The user also obtains a certificate c on the public key p, and may also obtain additional information such as information describing policies, identities, etc. associated with the public key p, all in a well-known conventional manner.

The user then in step 302 creates a second key pair (s', p') that is suitable for "fast" generation of signatures. More particularly, this second key pair may be a key pair associated with a conventional computationally-efficient signature technique, such as Merkle and Lamport signatures, signature coupons, etc., that is suitable for implementation on a lightweight device. Such techniques are referred to as "fast" in that they can be performed with less computational complexity, and therefore in a shorter amount of time, than other signature techniques.

The term "create" as used in steps 300 and 302 is intended to be construed generally so as to encompass any mechanism for generating or otherwise obtaining the corresponding secret and public key pairs.

In step 304, the user signs an agreement relating to the pair (p', p). This signing could be done using a third, previously-certified public key, using the public key p, or through other standard techniques. The user then sends the signed agreement to the signing aid 106. The signing aid 106 in step 306 signs the previously-signed agreement sent to it by the user. Copies of the twice-signed agreement are stored by both the signing aid and the user, as indicated in step 308. For example, the agreement may be stored in a memory such as memory 220 on both the signing aid 106 and the user device 102, and in addition or alternatively may be backed up on an auxiliary storage device such as disk 240 on both the signing aid 106 and the user device 102.

Step 310 indicates that the user sends the secret key s to the signing aid 106. This completes the setup process, and the signing aid is now able to generate signatures on behalf of the user in accordance with the techniques of the invention.

Figure 4:
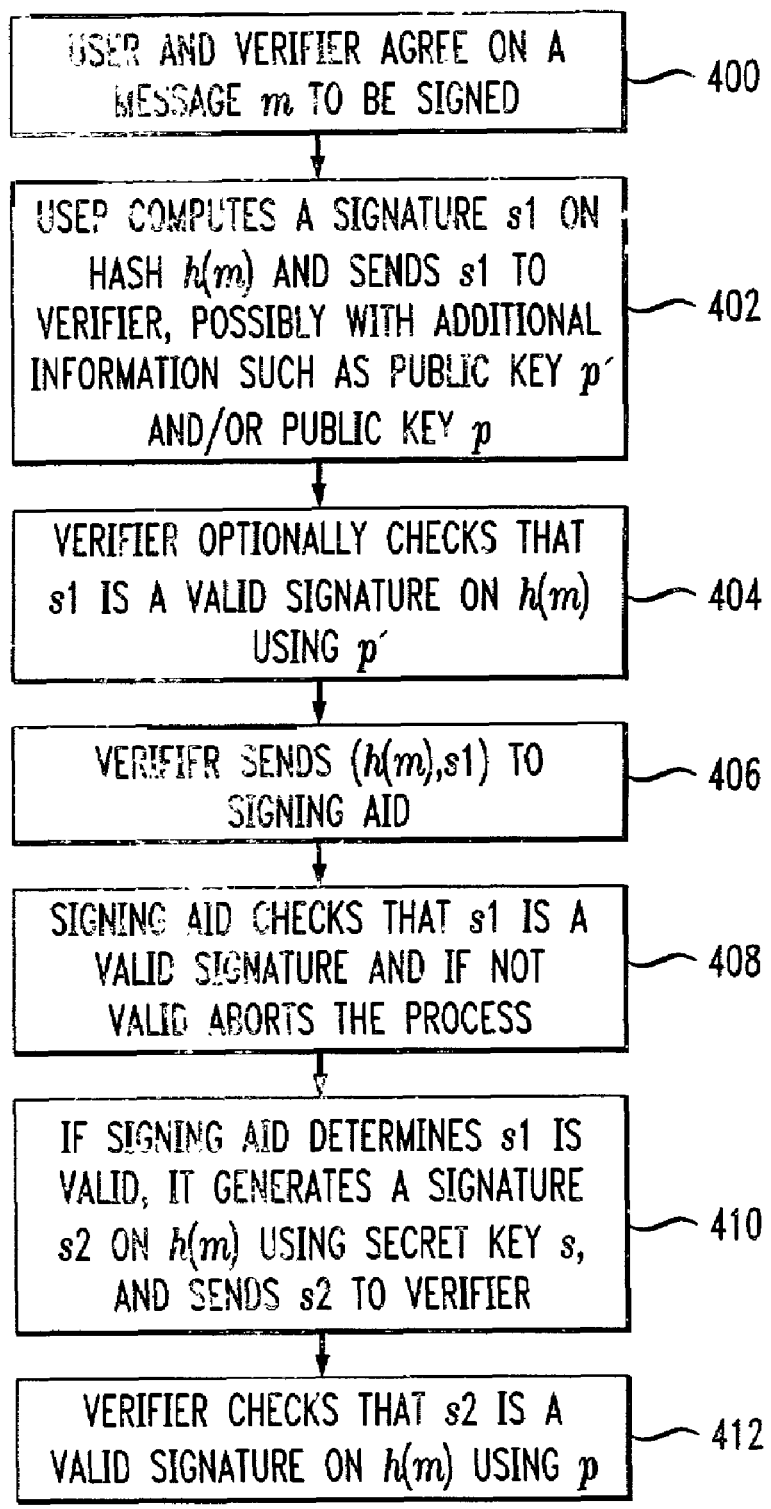

FIG. 4 shows an illustrative signature generation process that is performed in accordance with the invention. The process involves the user device 102, the signing aid 106 and the verifier 108 of the FIG. 1 system. It is assumed that the FIG. 3 setup process has been performed prior to commencing performance of the FIG. 4 signature generation process.

In step 400, the user and verifier agree on a particular message m to be signed by the user. The user then in step 402 computes a signature s1 on h(m) using the secret key s', where h(m) denotes the result of applying a hash function to the message m. Example hash functions suitable for use with the present invention include the well-known conventional hash functions MD5 and Secure Hashing Algorithm (SHA). Additional details regarding these and other hash functions, as well as other cryptographic techniques, suitable for use in conjunction with the present invention, can be found in, e.g., A. J. Menezes et al., "Handbook of Applied Cryptography," CRC Press, 1997, which is incorporated by reference herein.

The signature s1 is an example of one of the above-noted "cheap" signatures suitable for fast generation by the user device 102, e.g., generation in a computationally-efficient manner. The user sends s1 to the verifier, and may but need not also transmit one or both of the public keys p' and p or corresponding descriptions, certificates, etc. The public keys p' and p and corresponding descriptions, certificates, etc. may be stored elsewhere in the system, e.g., in a memory or other storage device associated with the certification authority 110.

It should be noted that the signature s1 may alternatively be computed directly on the message m rather than on h(m).

In step 404, the verifier may perform a check that s1 is a valid signature on h(m) using the public key p'. This check of signature s1 is optional and may be eliminated in a given embodiment of the invention.

The verifier in step 406 sends the pair (h(m), s1) to the signing aid 106. It should be noted that if the signature s1 was generated directly on the message m rather than on h(m), the verifier should send the pair (m, s1) to the signing aid rather than the pair (h(m), s1). Since the signature s1 in step 402 was computed on h(m), the verifier may send either the pair (h(m), s1) or the pair (m, s1). However, sending the pair (h(m), s1) is preferred in that the signing aid will not learn the message m but only its hash image.

The signing aid in step 408 upon receipt of the pair (h(m), s1) from the verifier checks that s1 is a valid signature on h(m) using the public key p'. If neither p' nor a description thereof was sent to the signing aid by the user, the signing aid may check the signature s1 with respect to all registered "cheap" public keys. If the signature s1 is not valid, the signing aid aborts the process, and otherwise continues with step 410.

In step 410, the signing aid generates a signature s2 on h(m) using the secret key s of the user. The signature s2 is then sent to the verifier. The pair (h(m), s1) is stored by the signing aid in an associated memory or other storage device.

The signature s2, like the signature s1, may alternatively be generated directly on the message m rather than on h(m).

The verifier in step 412 checks that the signature s2 is a valid signature on h(m) using the public key p.

Conflict resolution for a signature generated using the FIG. 4 process can be handled in the following manner. If the user believes that it did not generate the signature s2, it can send a corresponding complaint to the judge 112. The user then proves its identity to the judge using conventional techniques. The judge in turn requests the pair (h(m), s1) from the signing aid 106. If this pair is returned by the signing aid, and the public key p' has not been revoked, the judge rules that the signature was properly authorized. Otherwise, the judge rules that the signature was not properly authorized. As noted above, the judge 112 may be implemented as one or more processing devices programmed to provide the desired functionality.

If the user device 102 is lost or stolen, the corresponding user may contact the signing aid 106, and provide an access code comprising a personal identification number (PIN), date of birth, maiden name(s), etc. or suitable combination of these and other identifiers. The signing aid will then block the future generation of signatures associated with the public key p, until such time that the user reactivates or re-registers accordingly.

In accordance with another aspect of the invention, a delayed revocation feature can be provided in the signature generation process of FIG. 4 by configuring the signing aid 106 to wait for a predetermined amount of time before verifying that the signature rights associated with public key p have not been revoked. For example, this predetermined delay period may be selected to be on the order of 12 hours, such that all signatures will take 12 hours to "develop." The user may be permitted to shorten or cancel the predetermined delay by supplying to the signing aid a corresponding request with an access code or other suitable identifying information. If the user device is reported missing before the end of the delay period for a given signature, the corresponding signature generation process will be aborted and an appropriate message provided to the user. The signing aid may perform other computational tasks during this predetermined delay period. In addition, the signing aid may implement one or more policy-based checks, such as confirming sufficient funds in a user bank account if the signature relates to the transfer of funds, before generating the signature s2. If any of these checks gives a negative result, the signing aid may abort the signature generation process and send an appropriate message to the user. After the predetermined delay period and passage of any policy-based checks, the signature s2 is generated and sent to the verifier as indicated in step 410.

In another alternative embodiment of the invention, the signing aid 106 may be configured to generate the signature s2 without delay but also to provide to the verifier 108 information specifying a future time at which the signature will become valid. As another alternative, a first portion of the signature s2 can be sent to the verifier immediately, with a second portion of the signature s2 sent only after a predetermined delay period.

Advantageously, the delayed revocation feature of the present invention alleviates the signature repudiation problem associated with conventional techniques. In addition, this feature is particularly well suited for use with signature generation in electronic commerce applications involving debit or credit cards.

Another example of a secure digital signature process in accordance with the invention will now be described. In this example, a number of digital signatures are precomputed by the user device, a trusted third party or a set of trusted third parties. This precomputation by the user device may be when the device is "off-line" or otherwise has additional power or other computational resources available to it. For purposes of this example, the precomputed signatures will be referred to as coupons. These coupons are generated without knowledge of the particular messages that will be signed. As will be described below, a given coupon can be subsequently converted into a digital signature on a message m in a computationally-efficient manner.

More particularly, the precomputation noted above may be performed using the following steps:

1. Select a random number r1 from a set $[0, \ldots q-1]$ for a prime number q.
2. Compute $G=g^{r1}$ mod k, for an adequate prime number k, where g generates a group of size q.
3. Have G certified or registered, and store the pair (r1, G) and any relevant certificate as the coupon. The certification may be relative to a public key $y=g^x$ mod k of the coupon owner, where x denotes the secret key of the coupon owner.

The coupon may then be used by performing the following steps to sign the message m:

1. Compute $r2=r1-xm$ mod q.
2. Output (m, r2, G) along with any relevant certificate.

The signature can then be verified by verifying that $g^{r2}y^m=G$ and also verifying any relevant certificate, or by performing a lookup of G. The above-described coupon can only be used once, i.e., to sign a single message m using public key y. However, as indicated previously, one can precompute a large number of such coupons and store them on a user device. The user device can then generate the signatures from the coupons and send the signatures to an intermediary device which processes them in the manner described herein. Additional details regarding the selection of appropriate prime numbers q, k and generator g, as well as other aspects of the above example, can be found in, e.g., the above-cited A. J. Menezes et al. reference, "Handbook of Applied Cryptography," CRC Press, 1997.

In accordance with another aspect of the invention, a signature generation process such as that described above can be combined with one or more additional security measures in order to provide enhanced protection against signature repudiation. Examples of these additional security measures include the following:

1. Secure Operating Mode. The user device 102 can be configured so as to be switchable between normal and secure operating modes. The normal mode allows arbitrary programs to be executed, while in the secure mode, only particular programs, such as those "hard-wired" into the device, can be executed. Access to particular device resources, such as a storage location where the secret signing keys are kept, is restricted to the secure mode, by hard wiring, restricted operating system commands, or other suitable mechanism. This security measure can be used to defend against viruses performing forced signing attacks and can be combined with one or more other measures to avoid bait-and-switch attacks.

2. Requiring Message Understanding. A signature generation process in accordance with the invention can be configured to require user verification of a message before it will generate a signature on that message. By way of example, the verification may involve displaying a message or suitable graphical representation thereof when in the above-noted normal mode, and querying the user regarding contents of the message (e.g., "Are you aware that the effective rate on this credit agreement is 12%?"). Lists of secure messages may be maintained along with indications of the particular level of verification required for each. This measure can help to avoid the bait-and-switch attack noted above.

3. Alteration of Secret Key(s). One or more of the secret keys used in the signature generation process may be stored in a manner that prevents the generation of signatures without the involvement of the user. For example, the secret keys may themselves be encrypted using a user password or other access code, such that the user must enter the access code in order to initiate the signature generation process. This measure protects against theft-based attacks by making it more difficult for a thief to generate a signature.

4. Separation of Secret Key(s). It is also possible to separate a given one of the secret signing keys into two or more portions, where one portion may be contained in a smart card or other storage element carried separately from the user device 102. This defends against forced signing and theft in cases in which the smart card is also not stolen.

The use of each of these and other security measures described herein may be associated with a certain number of points, and the system may then be configured to require that different types of transactions be performed in a way that gives a total number of accumulated points greater than a specified threshold. For example, to pay for a newspaper using a lightweight device initiated digital signature may require no points at all, while paying for an airline ticket may require two points, a car five points, and real estate ten points. The verifier may be required to confirm that the tendered signature has the requisite number of points. If the verifier accepts a signature without the requisite number of points, it may be held liable in the event of any problem.

It should be understood that the above-described embodiments of the invention are illustrative only. For example, the invention can be implemented using other types and arrangements of system processing elements, and other types of digital signature protocols. In addition, the invention can use intermediary devices other than the above-described signing aid to interact with the user and verifier to implement signature generation in accordance with the invention. These and numerous other alternative embodiments within the scope of the following claims will be apparent to those skilled in the art.

What is claimed is:

1. A method for use in generating digital signatures in an information processing system, the system including at least a user device, an intermediary device and a verifier, the method comprising the steps of:

generating in the user device a first digital signature; and sending the first digital signature to the verifier;

wherein the verifier sends the first digital signature to the intermediary device, and the intermediary device checks that the first digital signature is a valid digital signature for the user device and if the first digital signature is valid generates a second digital signature which is returned to the verifier as a signature generated by the user device;

wherein the user device is switchable between a normal operating mode and a secure operating mode.

2. A method for use in generating digital signatures in an information processing system, the system including at least a user device, an intermediary device and a verifier, the method comprising the steps of:

generating in the user device a first digital signature; and sending the first digital signature to the verifier;

wherein the verifier sends the first digital signature to the intermediary device, and the intermediary device checks that the first digital signature is a valid digital signature for the user device and if the first digital signature is valid generates a second digital signature which is returned to the verifier as a signature generated by the user device;

wherein the first digital signature is generated only after user verification of the message to be signed.

3. A method for use in generating digital signatures in an information processing system, the system including at least a user device, an intermediary device and a verifier, the method comprising the steps of:

generating in the user device a first digital signature; and sending the first digital signature to the verifier;

wherein the verifier sends the first digital signature to the intermediary device, and the intermediary device checks that the first digital signature is a valid digital signature for the user device and if the first digital signature is valid generates a second digital signature which is returned to the verifier as a signature generated by the user device;

wherein at least one of first and second secret keys used to generate the respective first and second and second digital signatures are stored in an at least partially encrypted form on the user device and the intermediary device, respectively.

4. A method for use in generating digital signatures in an information processing system, the system including at least a user device, an intermediary device and a verifier, the method comprising the steps of:

generating in the user device a first digital signature; and sending the first digital signature to the verifier;

wherein the verifier sends the first digital signature to the intermediary device, and the intermediary device checks that the first digital signature is a valid digital signature for the user device and if the first digital signature is valid generates a second digital signature which is returned to the verifier as a signature generated by the user device;

wherein at least one of first and second secret keys used to generate the respective first and second and second digital signatures is configured such that a first portion thereof is stored in the user device and a second portion thereof is stored in a storage element removable from the user device.

5. A method for use in generating digital signatures in an information processing system, the system including at least a user device, an intermediary device and a verifier, the method comprising the steps of:

generating in the user device a first digital signature; and sending the first digital signature to the verifier;

wherein the verifier sends the first digital signature to the intermediary device, and the intermediary device checks that the first digital signature is a valid digital signature for the user device and if the first digital signature is valid generates a second digital signature which is returned to the verifier as a signature generated by the user device;

wherein if a user associated with the user device can contact the intermediary device and upon providing an access code thereto direct the intermediary device not to generate the second digital signature.

6. A method for use in generating digital signatures in an information processing system, the system including at least a user device, an intermediary device and a verifier, the method comprising the steps of:

generating in the user device a first digital signature; and sending the first digital signature to the verifier;

wherein the verifier sends the first digital signature to the intermediary device, and the intermediary device checks that the first digital signature is a valid digital signature for the user device and if the first digital signature is valid generates a second digital signature which is returned to the verifier as a signature generated by the user device;

wherein the user device precomputes a plurality of coupons, a given one of the coupons being utilizable to generate the first digital signature.

* * * * *